Figure 1:
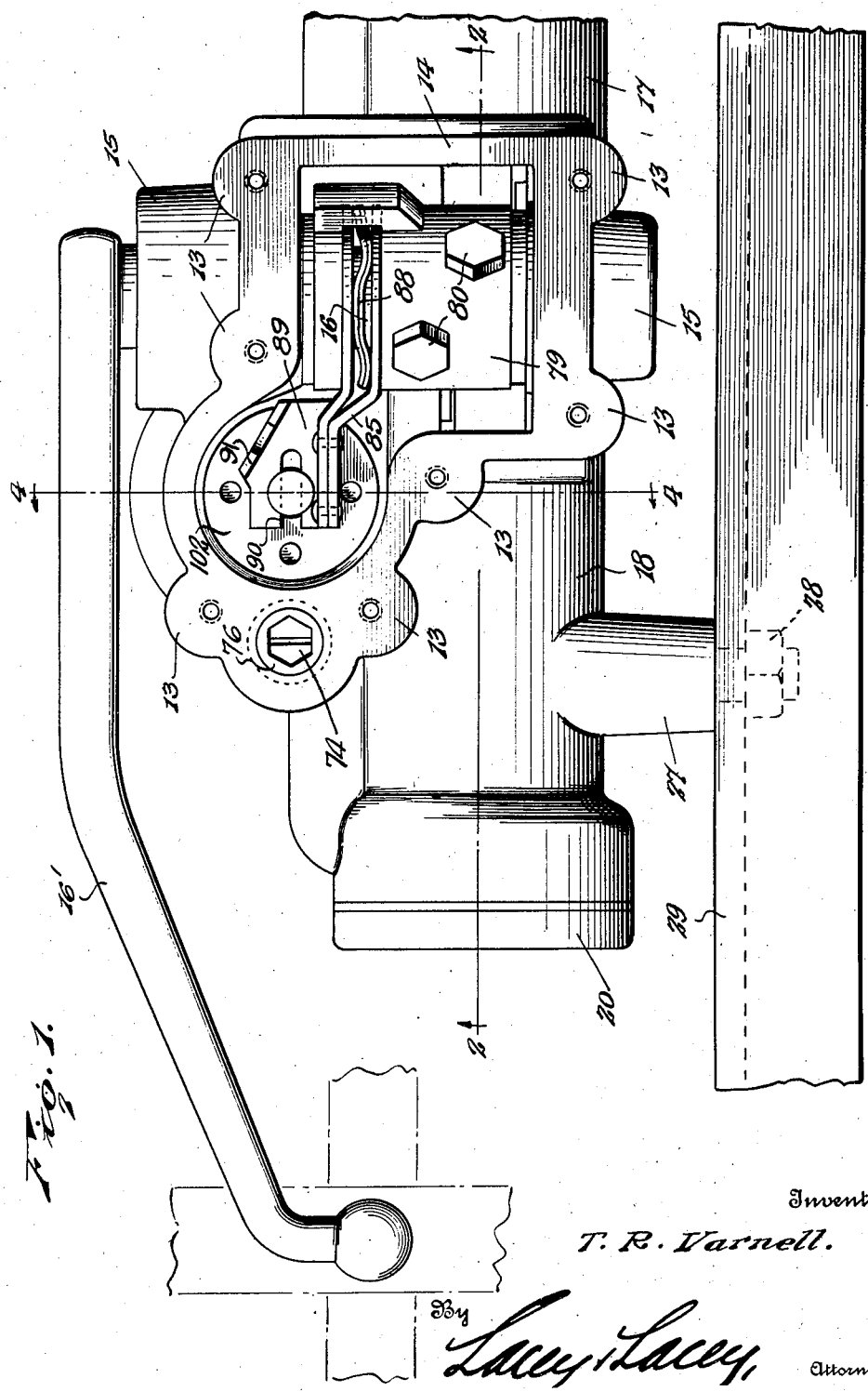

Feb. 12, 1935. T. R. VARNELL 1,991,265
INERTIA CONTROLLED SHOCK ABSORBER
Filed Jan. 30, 1933  5 Sheets-Sheet 1

Inventor
T. R. Varnell.
By Lacey & Lacey,
Attorneys

Feb. 12, 1935.   T. R. VARNELL   1,991,265
INERTIA CONTROLLED SHOCK ABSORBER
Filed Jan. 30, 1933   5 Sheets-Sheet 2
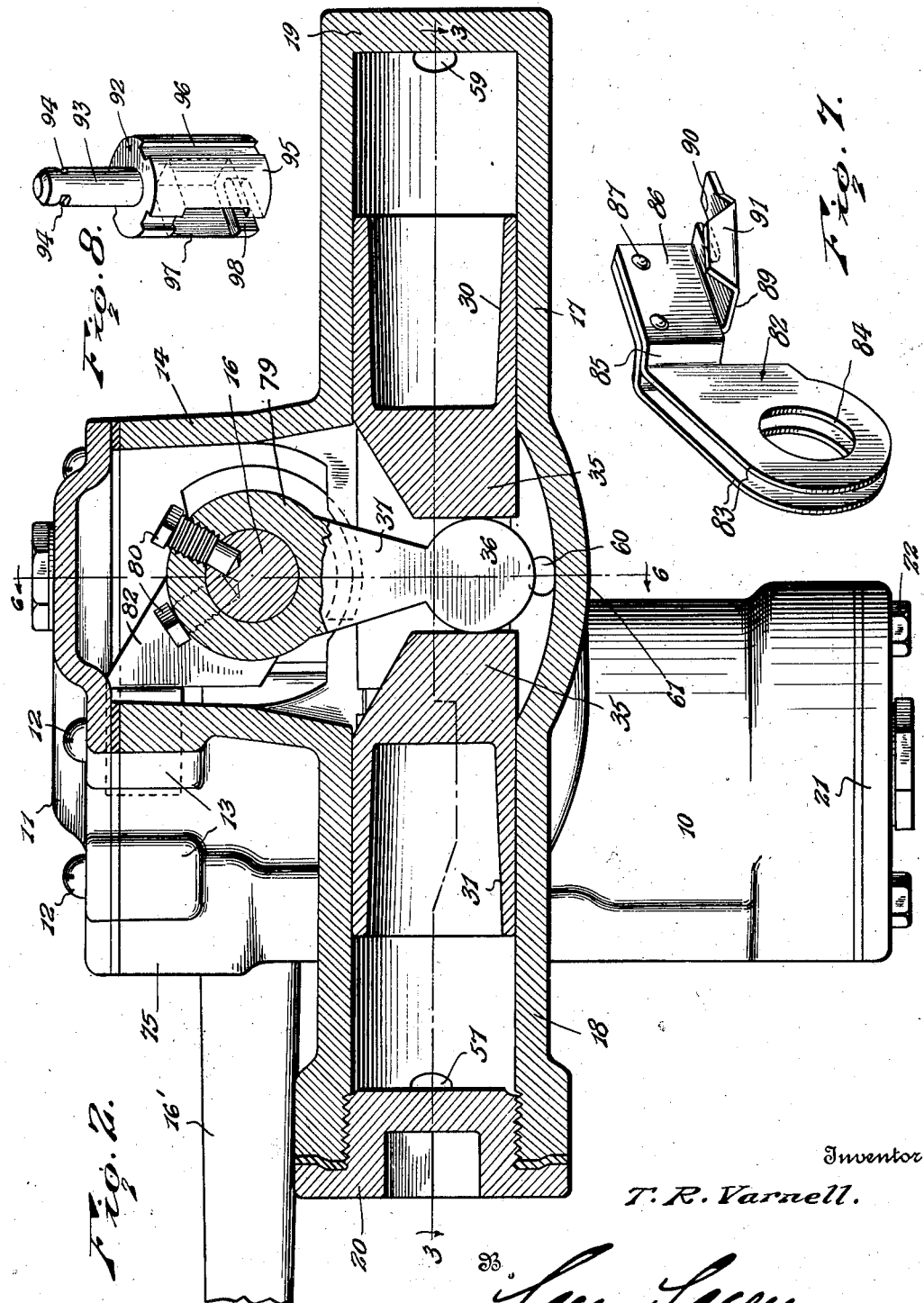
Inventor
T. R. Varnell.
Lacey & Lacey,
Attorneys

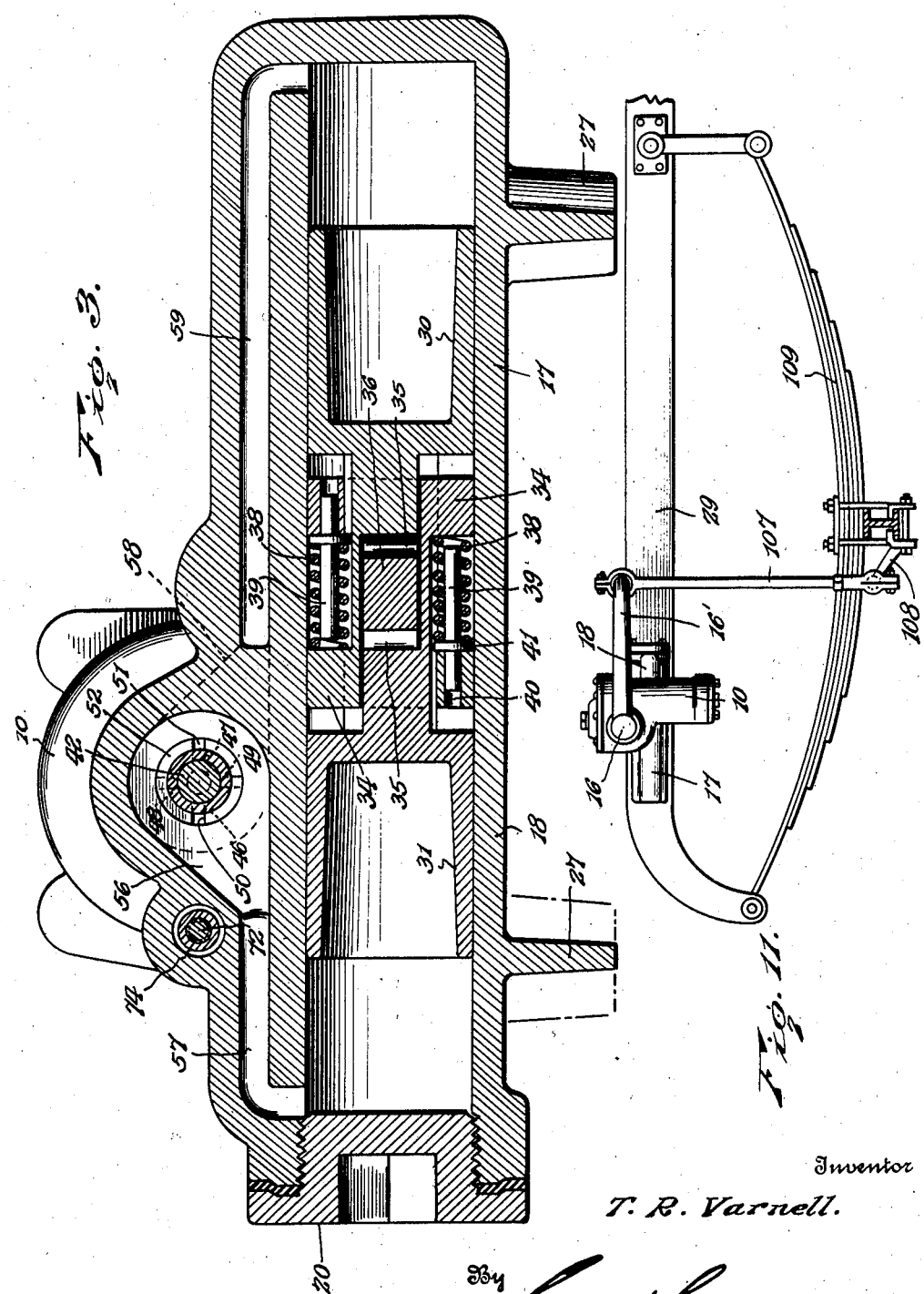

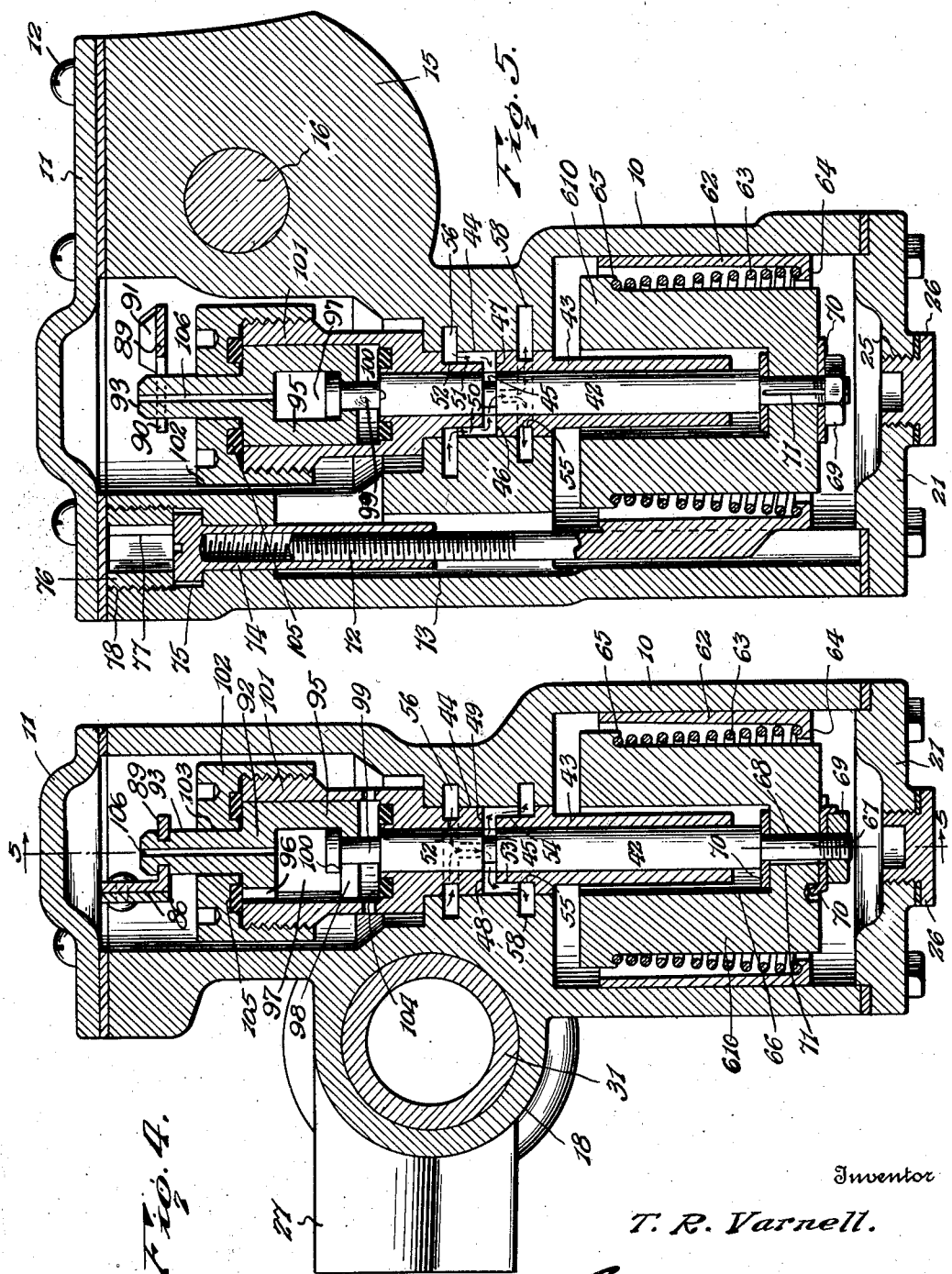

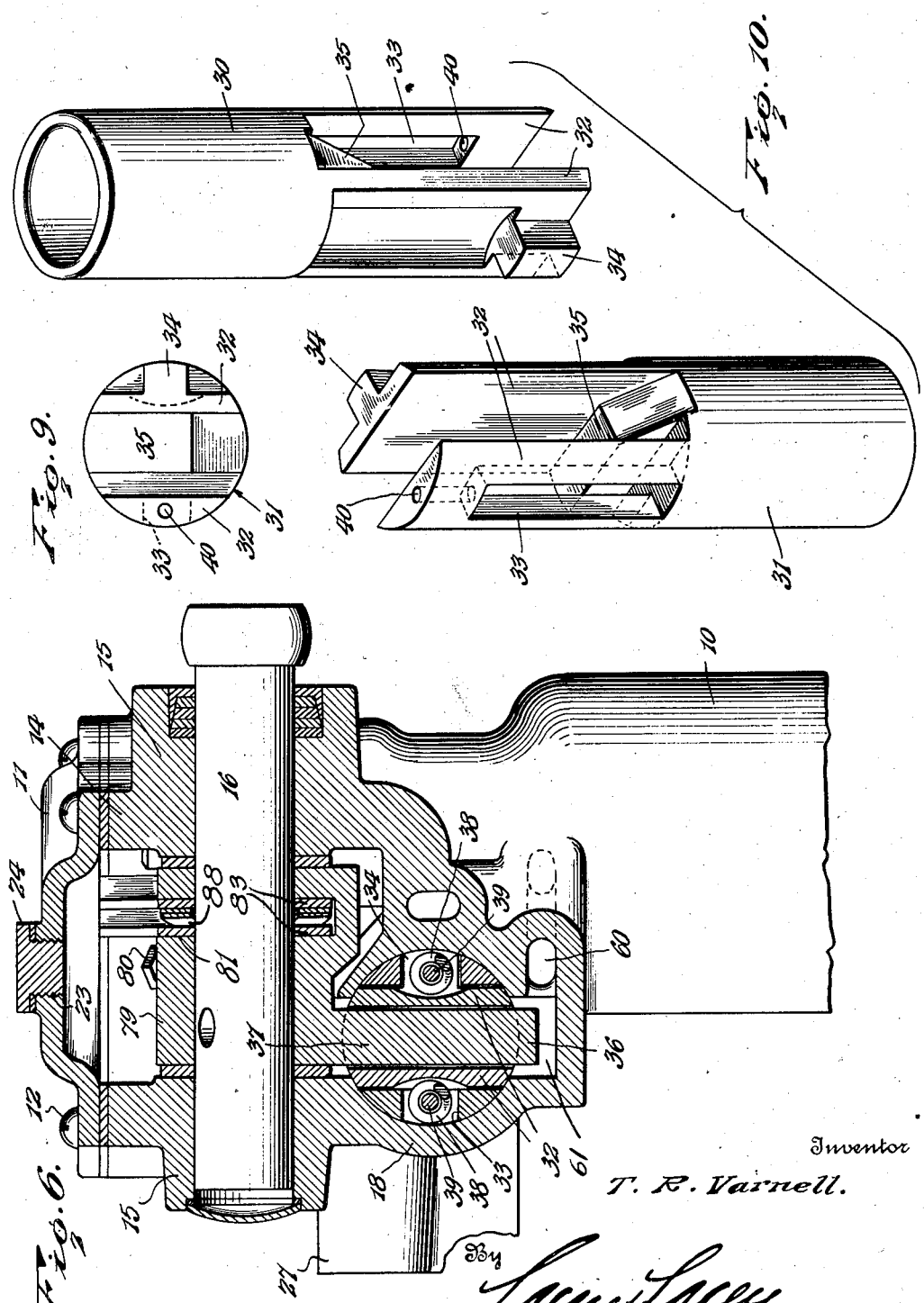

Patented Feb. 12, 1935

1,991,265

UNITED STATES PATENT OFFICE 1,991,265

INERTIA CONTROLLED SHOCK ABSORBER

Thomas Roscoe Varnell, Cleveland, Tenn.

Application January 30, 1933, Serial No. 654,338

9 Claims. (Cl. 188—88)

This invention relates to shock absorbers which are especially adapted for motor vehicles and has for an object to provide a shock absorber which will not interfere with the free movement of the wheels and axles of a vehicle either upwardly or downwardly, but will prevent the rapid movement of the body either upward or downward.

A further object is to provide a shock absorber in which the flow of fluid is controlled by means of a valve possessing inertia and which closes upwardly when the body of the vehicle is being accelerated downward and closes downwardly when the body is being accelerated upward and in either closed position operates to check the oil flow sharply, the result being that the shock absorber acts to impede sudden protracted vertical movement or rebound of the vehicle body while at the same time it permits the springs to function in the normal manner to absorb shock.

A further object is to provide a shock absorber having a valve which offers little or no resistance to opening or closing while under oil pressure.

A further object is to provide a shock absorber embodying opposed cylinders and pistons therein operated by movement of a rocker arm and adapted to pass a fluid through openings which are controlled by a valve possessing inertia and limited in movement to a predetermined extent, the parts being so arranged as to provide compactness of construction and sensitiveness of action.

With the above and other objects in view the invention consists in certain novel details of construction and combinations of parts hereinafter fully described and claimed.

In the accompanying drawings forming a part of this specification,

Figure 1 is a plan view of the shock absorber with the cover removed,

Figure 2 is a vertical longitudinal section taken on the line 2—2 of Figure 1 and showing the opposed cylinders and pistons, Figure 3 is a horizontal section taken on the line 3—3 of Figure 2, showing the oil passages and ports in the housing, as well as the valve for controlling flow of the fluid through the ports and passages, Figure 4 is a cross section taken on the line 4—4 of Figure 1 showing the valve in normal open position, Figure 5 is a vertical section taken on the line 5—5 of Figure 4 showing the valve in the same position as shown in Figure 4, Figure 6 is a vertical cross section taken on the line 6—6 of Figure 2, Figure 7 is a detail perspective view of the crank arm, Figure 8 is a detail perspective view of the stop, Figure 9 is an end elevation of one of the pistons, Figure 10 is a perspective view showing both of the identical interfitting pistons in separated condition to disclose the construction thereof, and Figure 11 is a reduced side elevation of the shock absorber applied to the frame and axle of a vehicle.

Referring now to the drawings in which like characters of reference designate similar parts in the various views 10 designates an upright housing having a removable cover plate 11 secured by screws 12 threaded into bosses 13 carried by the housing.

The housing is provided at the front, near the top, with a transverse casing 14 which is provided with bearings 15 for the shaft 16 of the rock arm 16'. The casing and the housing communicate, as best shown in Figure 1, and constitute a reservoir for oil. Cast enbloc with the housing and casing is a pair of longitudinal alined cylinders 17 and 18, the former being closed at its outer end by an integral wall 19 and the latter being closed by a threaded cap 20. Both cylinders communicate at their inner ends with the casing and the cylinders are also filled with oil.

The bottom of the housing is closed by a cover 21 which is secured by means of screws 22, the removal of which permits access to the interior of the housing. The top cover 11 may be removed by removal of the screws 12 to afford access to the interior of the housing and the casing. The top cover is provided with a filling opening 23 which is closed by a threaded plug 24 and the bottom cover is provided with a drain opening 25 which is closed by a threaded plug 26.

Projecting laterally from both cylinders are two threaded lugs 27 which take stud bolts 28 for attaching the shock absorber to the frame 29 of the vehicle.

The cylinders are provided, respectively, with hollow pistons 30 and 31 which are identical in construction and are counterparts of each other and are best shown in Figure 10. Each piston is provided at its closed end with a pair of longitudinal ears 32, one of which is equipped with a longitudinal slot 33 and the other of which is equipped, near the extreme end, with a tongue 34. The pistons interfit, the tongue of one extending through the slot 33 of the other. Each piston is provided, between the ears, with a lug 35 and when the pistons are assembled these lugs confront each other and receive between them the circular head 36 of a crank 37, best shown in Figure 2, for actuating the pistons as a unit.

For holding the pistons tightly against the head 36, a spring 38 is housed in the slot 33 of each piston and surrounds a pin 39, one end of which is fitted in an opening 40 in the ear, as best shown in Figure 3. The pin is provided with a stop collar 41 that engages the end wall of the slot. The spring expands against the tongue 34 of the mating piston and urges the tongue toward the opposite end of the slot 33 so that both pistons are yieldably confined snugly against the head 36 of the crank 37. The pins 39 prevent any great separation of the piston lugs from the crank head.

By referring particularly to Figures 4 and 5, it will be seen that a valve 42 of circular cross section is disposed axially in the housing 10 and is slidably fitted in a bushing 43 which is pressed or otherwise snugly fitted in an axial opening 44 constituting a reduced portion of the bore of the housing. The valve is provided with a circumferential groove 45 which, in the normally open position of the valve, is in registration with four openings 46, 47, 48 and 49 formed in the valve bushing, as shown in plan in Figure 3 and in elevation in Figures 4 and 5. These four openings are drilled radially and accurately at 90° apart in a plane at a right angle to the axis of the bushing. From these four openings, grooves are cut into the outer surface of the bushing parallel to its axis, two of the grooves 50 and 51 being disposed diametrically opposite each other and running upward to an annular groove 52 formed in the bushing, as shown best in Figure 5. The other two grooves 53 and 54 are disposed diametrically opposite each other and run downward to another annular groove 55 formed in the bushing, as shown in Figure 4.

Formed in the bore 44 of the housing is a port 56 which registers with the upper annular groove 52 in the bushing and which opens into a passage 57 which leads into the outer end of the cylinder 18. Also formed in the bore of the housing is a port 58 which registers with the lower annular groove 55 formed in the bushing and is connected by a passage 59 to the outer end of the cylinder 17.

A passage 60 connects the sump 61 between the inner ends of the cylinders with the chamber in the bottom of the housing, as best shown in Figures 2 and 6 so that oil pressure against the top and bottom of the valve 42 will be equalized and the valve will consequently offer little, if any, resistance to opening or closing, while under pressure.

As the valve moves either upward or downward it closes the before-mentioned openings 46, 47, 48 and 49 by movement of the groove 45 out of register therewith. In the normally open position of the valve the fluid enters the groove 45 at two of the diametric opposite openings and leaves it at the other two diametric openings on the same level, as shown in Figures 4 and 5, so that there is no tendency of the valve to bind in the bushing and it will operate easily at all times.

Attached to the valve is a weight 610 formed of lead or other metal. A cylindrical seat 62 is disposed snugly against the wall of the chamber in the bottom of the housing around the weight and serves as a retainer for a conical helical spring 63, the lower end of which is supported upon a flange 64 at the bottom of the seat and the upper end of which is engaged underneath a flange 65 formed at the top of the weight.

The weight is provided with an axial opening 66 which loosely receives the valve bushing 43 and the valve 42 and the latter is provided with a reduced threaded extension 67, which extends through an aperture 68 in the weight and is equipped with a nut 69 and washer 70. A key 71 is driven into a suitable keyway in the extension and bore of the aperture 68 and prevents relative turning of the valve and weight so that the nut 69 may be screwed tight to rigidly secure the weight to the valve.

It will be observed that the spring 63 is disposed outside the weight and this makes possible an adjustment of the spring tension, about to be described, and also produces a great length of wire in the spring to make very slow the natural rate of oscillation of the weight and valve. It will also be observed that the valve bushing 43 extends below the center of gravity of the weight and also of the valve so that side sway of the vehicle will not bind the valve in the bushing.

For adjusting the tension of the spring, the seat 62 is provided on one side with an upright threaded rod 72 which rises through an opening 73 in the housing, as best shown in Figure 5. The rod threads into a barrel nut 74, the head of which rests upon the bottom 75 of a well in the housing. Rotation of the barrel nut raises or lowers the rod 72 to correspondingly move the seat 62 and adjust the spring sufficiently to yieldably maintain the valve open, that is, with the groove 45 in registration with the four openings 46, 47, 48 and 49. A tubular threaded follower 76 is provided with a hexagonal wrench bore 77 by means of which the follower is screwed down the threaded wall 78 of the well into contact with the barrel nut to hold the barrel nut in place.

For controlling and limiting movement of the valve, the crank 37 is provided with a hub 79 which is rigidly secured to the rock shaft 16 by means of screws 80, as best shown in Figures 2 and 6. The hub is provided with a slot 81 which is disposed at a right angle to the axis of the hub and extends from the top to nearly the bottom of the hub. This slot receives a spring metal crank arm 82, shown best in Figure 7.

The crank arm comprises a pair of parallel metal plates 83 which are provided with alined openings 84 to loosely receive the shaft 16. The plates are offset laterally, as shown at 85 in Figure 1, and directed at their extremities to lie flat upon each other and these flat extremities 86 are riveted together, as shown at 87. A corrugated annular spring 88 encircles the shaft between the plates and urges the plates apart to frictionally engage the side walls of the slot 81 in the hub, as shown in Figures 1 and 6 so that the rock shaft turns the crank arm.

A lip 89 projects laterally from the lower edge of one of the extensions 86 and the lip is provided with a slot 90 and preferably one edge of the lip is turned upwardly, as shown at 91, to stiffen the lip. The lip is of sufficient length to extend into the upper chamber of the housing 10 and overhang the valve 42.

A stop link 92, best shown in Figure 8, is carried by the lip. The link is reduced at the top to form a stem 93 which is provided with kerfs 94 that permit of the stem being passed into the slot 90 and held by the lip. The link is uniformly enlarged at the bottom to provide a barrel 95, the peripheral wall of which is equipped with grooves 96 which extend parallel to the axis of the barrel and permit the passage of oil along the barrel.

The barrel is provided in one side with a substantially square recess 97, and in its bottom is equipped with a slot 98 which communicates with the recess. The purpose of the recess and the slot is to receive a reduced neck 99 formed on the valve 42, as shown in Figures 4 and 5. When the link is moved up or down by the crank arm 82, the bottom presses against one of the shoulders 100 at the ends of the neck 99 and prevents the valve from closing in one direction but leaves it free to close in the opposite direction.

The upper end of the valve bushing 43 is enlarged to form a housing 101 for the barrel 95 of the stop link, and is closed by a cap 102 which limits upward movement of the stop link. The cap is provided with a central opening 103, which slidably receives the stem 93 of the link. Resilient bumper rings 104 and 105 are confined in suitable grooves in the bottom of the housing and in the bottom of the cap 102. These rings absorb the shocks of impact of the stop link when moved by the crank arm 82.

It will be observed that there is an axial opening 106 in the stop link stem. The purpose of this is to permit the valve 42 to be properly adjusted. To accomplish this a small wire feeler is inserted through the aperture 106 until the feeler rests on the valve 42. The barrel nut 74 is then adjusted to so dispose the valve that when the valve stop link 92 is moved either upward or downward no motion is imparted to the valve.

It will also be observed that the passage 60 and the opening 73 in the housing afford free circulation of the oil between the weight chamber in the bottom of the valve housing 10 and the reservoir in the top of the housing so that pressure against the top and bottom of the valve will be equalized.

The shock absorber is secured to the body frame 29 by means of the bolts or lag screws 28 and the rocker arm 16' is connected to the axle by a link 107 and bracket 108, as shown in Figure 11. The operation is as follows:

When the vehicle passes over small inequalities in the road surface, the axle is rapidly vibrated up and down within a small range of movement, and imparts to the rocker arm 16' and pistons 30 and 31 a corresponding movement. However, because there is little upward or downward movement of the vehicle body, the heavy weighted valve 42 is only slightly influenced and remains in normal open position. In this position of the valve, there is free communication between the compression spaces of both cylinders by way of the passages 57, 59, the grooves and openings in the valve bushing and the groove 45 in the valve, thereby permitting a free vibration of the pistons without interference with the resiliency of the vehicle springs 109.

Should the vehicle wheels encounter a hump of sufficient height to produce a marked upward movement of the axle, it is brought nearer the vehicle body compressing the vehicle springs beyond their neutral position. Simultaneously, the hub 79 is turned and shifts the pistons as a unit in a direction toward the outer end of the cylinder 18. As long as the axle of the vehicle continues to move upward in relation to the body and thus further compress the vehicle spring, the weighted valve cannot lag behind a possible upward movement of the body and close the valve downwardly because the rocker arm 82, which tends to turn with the hub 79 has lifted the valve stop link 92 so that the link rests against the upper shoulder 100 of the valve and holds the valve open. Hence there is no interference whatever with the upward movement of the axle.

But immediately after the vehicle axle has ceased to move upward relative to the body, the spring having reached its maximum compression, the hub 79 reverses its direction of rotation and simultaneously moves the rocker arm 82 which depresses the stop link 92 freeing the valve so that it now lags behind the continued upward acceleration of the vehicle body and closes the valve downward to seal the openings 46, 47, 48 and 49. The closing of the valve impedes the return of the oil under pressure through the passages 59 and 57 to the cylinder 18 so that the rocker arm is held against rapid movement and the rebound or tendency of the vehicle to be projected violently upward is positively prevented. When the slow upward movement of the vehicle body has continued until the vehicle spring has reached its neutral or normal position, there is no further upward acceleration of the body and hence no further tendency for the inertia of the weighted valve to hold it in a closed position and it is returned to its open position by the valve spring 63.

When the vehicle axle encounters a depression in the roadbed of sufficient depth to permit a marked downward movement of the vehicle wheels, causing the axle to move further away from the vehicle body and expanding the vehicle springs beyond their neutral position, the above described steps of operation are reversed. In this instance, the valve stop link engages the lower shoulder 100 on the valve and prevents upward closing of the valve and consequent interference with the free movement of the vehicle axle until the vehicle spring has reached its maximum expansion, but the stop link then moves upward freeing the valve so that its own inertia opposing the downwardly accelerating vehicle body closes the valve upward and thereby impedes the downward movement of the body.

From this explanation of the operation, it is evident that this shock absorber so operates that it allows perfectly free movement of the wheels of a vehicle but very effectively prevents objectionable movement of the body of the vehicle.

What is claimed is:

1. A shock absorber for controlling movement of relatively movable parts comprising a fluid containing member adapted to be attached to one of the parts, a fluid containing cylinder carried by the member, ported means carried by the member establishing communication between opposite ends of the cylinder, a piston in the cylinder, means for operatively connecting the piston to be moved by the other of said parts, a weighted spring pressed valve in said member possessing inertia and adapted to control said ported means, and means responsive to movement of the piston and adapted to hold the valve against movement in one direction while permitting the valve to move in the opposite direction.

2. A shock absorber for controlling movement of relatively movable parts comprising a member adapted to be attached to one of the parts and having fluid containing opposed cylinders and a passage establishing communication between said cylinders, a piston in each cylinder, means carried by the member for operatively connecting the piston to be moved by the other of said parts, a weighted valve for controlling said passage and the flow of fluid therethrough, a spring adapted to support the weighted valve to occupy a substantially balanced open position with relation to said passage whereby the valve will be influenced by its own inertia to close the passage upon predetermined movement of said parts, and means responsive to movement of the piston and adapted to hold the valve against movement in one direction while permitting the valve to move in the opposite direction.

3. In a fluid check shock absorber, a housing, a cylinder carried thereby, a piston in the cylinder, said housing and said cylinder being filled with fluid, a ported passage in the housing for establishing circulation of the fluid under impulse of the piston, a vertically disposed valve in the housing controlling said passage, a weight carried by the lower end of the valve, a spring surrounding the weight, means carried by the housing for adjusting the tension of the spring to yieldably support the valve in normally open position, and means responsive to movement of the piston adapted to hold the valve against movement in one direction while permitting the valve to move in the opposite direction.

4. In a fluid check shock absorber, a housing, a cylinder carried thereby, a piston in the cylinder, said housing and said cylinder being filled with fluid, fluid passages leading from the ends of the cylinder and terminating in superposed ports in the bore of the housing, a valve bushing in said bore having superposed annular passages registering with said ports and having vertically disposed passages about 90° apart and extending to a central point between said annular passages, a weighted valve mounted in said bushing and having an annular groove in communication with said vertically disposed passages, and a spring adapted to support the weighted valve to occupy a substantially balanced open position with relation to said passages whereby the valve will be influenced by its own inertia to close the passages upon predetermined movement of the valve.

5. In a fluid check shock absorber, a housing, alined cylinders carried thereby, pistons in said cylinders, said housing and said cylinders being filled with fluid, a rocker arm shaft carried by the housing, a crank carried by the shaft for reciprocating both pistons, ported passages in the housing for establishing circulation of the fluid in the ends of the cylinders under impulse of the pistons, a vertically disposed valve in the housing controlling said passages, a weight carried by the lower end of the valve, a spring supporting the weight to position the valve to occupy a substantially balanced open position with respect to said ported passages, a crank arm carried by said rocker arm shaft and extending into said housing to overhang the valve, and a stop link carried by the free end of the last named crank arm and operatively connected to the upper end of said valve to hold the valve against movement in one direction while permitting the valve to move in the opposite direction.

6. In a fluid check shock absorber, a housing, a cylinder carried thereby, a piston in the cylinder, said housing and said cylinder being filled with fluid, a ported passage in the housing for establishing circulation of the fluid under impulse of the piston, a vertically disposed valve in the housing controlling said passage, a weight carried by the lower end of the valve, a seat in the housing surrounding the weight and spaced therefrom, a spring interposed between the seat and the weight and yieldably supporting the weight, a vertically disposed rod carried by the seat and threaded at its upper end, there being a well formed in said housing laterally of the axis thereof, and a barrel nut seated in the well and having a screw thread engagement with the upper end of the stand rod for adjusting the tension of the spring to support the valve to occupy a substantially balanced open position with relation to said passage.

7. In a fluid check shock absorber, a housing, a cylinder carried thereby, a piston in the cylinder, said housing and said cylinder being filled with fluid, a ported passage in the housing for establishing circulation of the fluid under impulse of the piston, a spring-pressed weighted valve in the housing controlling said passage, a rocker arm shaft carried by the housing, a crank fixed to the shaft and engaging the piston for actuating the piston, a hub on the shaft having a slot formed at a right angle to the axis of the shaft, a second rocker arm carried by the shaft including a pair of resilient spaced plates perforated to receive the shaft and seated in said slot, said plates being terminally equipped with a lip disposed to overhang the valve, a spring encircling said shaft between said plates and pressing the plates apart to frictionally engage the side walls of said slot whereby the shaft frictionally moves said crank arm, and a stop link carried by said lip and loosely engaging the upper end of the valve, said link being adapted to hold the valve against movement in one direction while permitting the valve to move in the opposite direction.

8. In a fluid check shock absorber, a housing, a cylinder carried thereby, a piston in the cylinder, said housing and said cylinder being filled with fluid, a ported passage in the housing for establishing circulation of the fluid under impulse of the piston, a vertically disposed weighted spring-pressed valve in the housing controlling said passage, said valve having an annular groove near the upper end thereof, a stop link including a stem and a barrel disposed above said valve, said barrel having a recess in one side and having a slot in the bottom communicating with said recess, said reduced portion of the valve being passed into said slot, means responsive to movement of the piston for moving said stop link relatively to the valve, a housing for the stop link, a cap closing the housing, and having an opening slidably receiving said stem, said cap limiting upward movement of said stop link, bumpers on the lower face of the cap and on the bottom of the stop link housing for cushioning shock of impact of the stop link at each limit of movement, and shoulders formed on the valve at the ends of said reduced portion thereof, the bottom of said stop link being adapted to engage one of the shoulders at each limit of movement of the stop link and hold the valve against movement in one direction while permitting the valve to move in the opposite direction.

9. In a fluid check shock absorber, a housing, a pair of alined cylinders carried thereby closed at their outer ends and communicating at their inner ends, said housing and said cylinders being adapted to be filled with fluid, pistons in the cylinders each having a pair of longitudinal ears on one end, the ears of both pistons interfitting, one ear of each piston being provided with a slot and the other ear being provided with a tongue, the tongue of one piston fitting in the slot of the other piston, springs seated in the slots bearing against the tongues, lugs on the pistons, a rocker arm, a rocker arm shaft carried by the housing, a crank on the shaft having its free end interposed between the lugs and adapted to move the pistons as a unit, the springs resisting seperation of the said free end of the crank from the lugs, there being passages in the housing and cylinders opening into the ends of the cylinders for permitting circulation of the fluid by movement of the pistons under impulse of the crank, a weighted spring-pressed valve in the housing controlling circulation of the fluid, and means responsive to movement of the pistons and adapted to hold said valve against movement in one direction while permitting the valve to move in the opposite direction.

THOMAS ROSCOE VARNELL. [L. S.]